[11] 3,575,495

[72] Inventors Raymond E. Tibbetts
Mahopac;
Janusz S. Wilczynski, Ossining, N.Y.
[21] Appl. No. 869,596
[22] Filed Oct. 27, 1969
[45] Patented Apr. 20, 1971
[73] Assignee International Business Machines Corporation
Armonk, N.Y.

[54] HIGH SPEED DOCUMENT LENS HAVING FIVE ELEMENTS
2 Claims, 3 Drawing Figs.
[52] U.S. Cl. ........................................................ 350/219
[51] Int. Cl. ........................................................ G02b 9/60
[50] Field of Search ............................................ 350/219

[56] References Cited
UNITED STATES PATENTS
2,586,866 2/1952 Schade ........................ 350/219

*Primary Examiner*—John K. Corbin
*Attorneys*—Hanifin and Jancin and John J. Goodwin ABSTRACT: A lens is described having a high light gathering ability which may be employed in document reading and/or sorting machines. The lens includes five lens elements, a first biconvex lens element, a first meniscus lens element, a biconcave lens element, a second meniscus lens element and a second biconvex lens element.

INVENTORS
RAYMOND E. TIBBETTS
JANUSZ S. WILCZYNSKI

BY John J. Goodwin

ATTORNEY

HIGH SPEED DOCUMENT LENS HAVING FIVE ELEMENTS

BACKGROUND OF THE INVENTION

Field of the Invention

The present invention is in the field of optics and more particularly relates to multielement high speed document lenses.

SUMMARY OF THE INVENTION

Optical scanners which are used for document reading and/or sorting require lenses which have high light gathering power, uniform resolution over their usable field, and a relatively large focal range to allow for different thickness of documents and checks and to allow for flutter, mechanical runout, etc. which occur during scanning.

It is an object of the present invention to provide a high quality lens for use in optical scanners or infrared memory devices using light emitting diodes or lasers, etc. as energy sources.

The foregoing and other objects, features and advantages of the invention will be apparent from the following more particular description of preferred embodiments of the invention, as illustrated in the accompanying drawings.

BRIEF DESCRIPTION OF DRAWINGS

In the drawings:

Referring to FIG. 1, the lens of the present invention is depicted including five lens elements referred to as element I, element II, element III, element IV and element V. Element I is a biconvex lens, element II is a meniscus lens, element III is a biconcave lens, element IV is a meniscus lens and element V is a biconvex lens. Elements I, II, III, IV and V have thicknesses along the central lens axis of $t_1$, $t_2$, $t_3$, $t_4$ and $t_5$ respectively. Elements I and II are separated by axial air space $S_1$, elements II and III are separated by distance $S_2$, elements III and IV are separated by distance $S_3$ and elements IV and V are separated by distance $S_4$.

The curvature of the front and rear surfaces of element I are specified by radii $R_1$ and $R_2$ respectively, likewise element II is specified by radii $R_3$ and $R_4$, element III is specified by radii $R_5$ and $R_6$, element IV is specified by radii $R_7$ and $R_8$ and element V is specified by radii $R_9$ and $R_{10}$. The lens has a relative aperture of $f/1.5$ and a magnification of $-1.0X$.

The lens of the present invention is particularly useful in high speed reader/sorters. High speed reader/sorters are employed to handle documents such as cancelled checks, sales slips, and the like. The lens in such device optically relays the desired information from the document to the receptor and should perform with the highest possible efficiency.

The lens of the present invention produces an image of high contrast whose spatial frequency is approximately four or five lines per millimeter to process characters having line widths in the order of 0.005 inches. A higher spatial frequency is not desired because if finer frequencies were processed the reader would record unwanted material such as specks, blemishes and shadows of folds and creases. In order to provide an optical correction which transmits only a low spatial frequency range and essentially nothing in finer frequency ranges, the lens yields a homogenous blur circle of a constant diameter over the required field.

Figure 2:
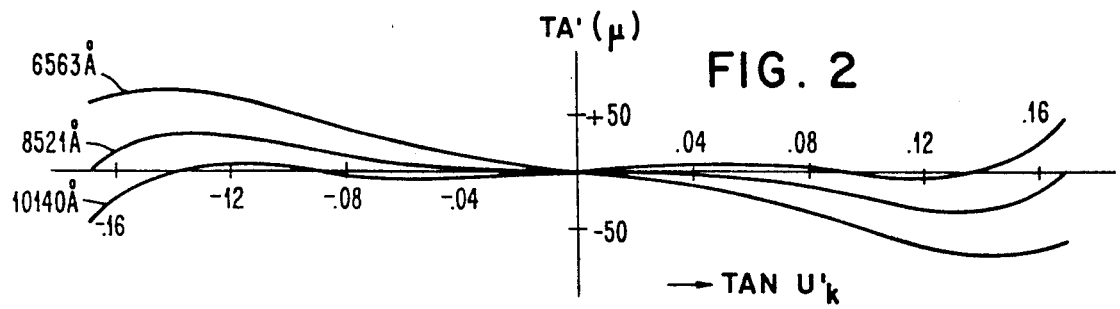
FIG. 2 is a curve showing spherical aberrations for the lens of FIG. 1.
Figure 3:
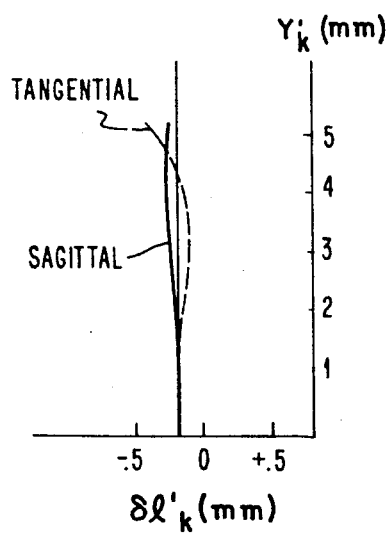
FIG. 3 is a curve showing the astigmatism for the lens of FIG. 1.

The lens of the present invention provides the necessary blur circle primarily by the balance of spherical aberration of the mean wavelength of 8521 Angstroms as shown in FIG. 2. The third and fifth order spherical aberrations combine to produce a homogeneous blur circle of approximately 40 microns in diameter.

Figure 1:
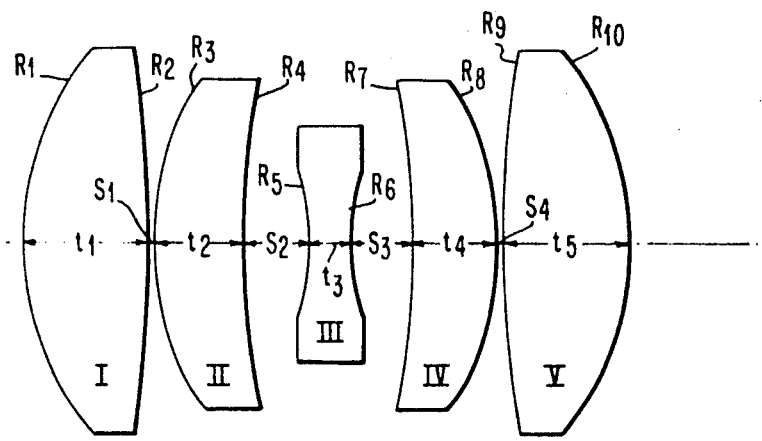
FIG. 1 is an illustration of an embodiment of a lens in accordance with the principles of the present invention.

FIG. 2 shows the aberration of the main wavelength together with the aberrations of approximately upper and lower bounds of the usable bandwidth. The longitudinal chromatic aberration is only partially corrected thereby further enlarging the blur circle to a desired size and also enhances homogeneity The lens of FIG. 1 is specified in terms of its constructional data: the radii, thickness and air spaces. The values of the specific parameters can vary within given ranges. Embodiments of the lens having constructional data within the ranges provides almost identical performance. If the given constructional ranges are exceeded, the correction of the resulting lens will be changed. The following table I sets forth the limiting ranges for the radii, thicknesses and air spaces and six specific embodiments of lenses having parameters within the ranges are set forth hereinafter. The performance of the six embodiments specified in terms of transverse spherical aberration is also set forth to illustrate that the embodiments have essentially the same correction.

TABLE I

| Lens | Radii | Thicknesses and airspaces |
|---|---|---|
| I | $.470f < +R_1 < .510f$ | $.195f < t_1 < .210f$ |
|   | $2.27f < -R_2 < 2.63f$ | $.008f < S_1 < .022f$ |
| II | $.474f < +R_3 < .514f$ | $.142f < t_2 < .156f$ |
|   | $1.62f < +R_4 < 1.98f$ | $.102f < S_2 < .112f$ |
| III | $.330f < -R_5 < .352f$ | $.043f < t_3 < .079f$ |
|   | $.330f < +R_6 < .352f$ | $.102f < S_3 < .112f$ |
| IV | $1.62f < -R_7 < 1.98f$ | $.142f < t_4 < .156f$ |
|   | $.474f < -R_8 < .514f$ | $.008f < S_4 < .022f$ |
| V | $2.27f < +R_9 < 2.63f$ | $.195f < t_5 < .210f$ |
|   | $.470f < -R_{10} < .510f$ | |

Where $f$ represents the equivalent focal length of the lens group which is 26.2 millimeters at 8521 Angstroms.

The following six embodiments also have an $f$-number of $f/1.5$. It is to be noted that the values of $R_6$, $R_7$, $R_8$, $R_9$ and $R_{10}$ are the same as $R_5$, $R_4$, $R_3$, $R_2$ and $R_1$ respectively except that they are of opposite sign since the curvature is in the opposite direction.

EMBODIMENT ONE

| Lens | Radius | Thickness (t) or airspace (S) | $N_D$ | V |
|---|---|---|---|---|
| I | $R_1 = +.4904f$ | $t_1 = .2023f$ | 1.62032 | 60.3 |
|   | $R_2 = -2.4518f$ | $S_1 = .0153f$ | | |
| II | $R_3 = +.4943f$ | $t_2 = .1489f$ | 1.62032 | 60.3 |
|   | $R_4 = +1.8028f$ | $S_2 = .1057f$ | | |
| III | $R_5 = -.3405f$ | $t_3 = .0611f$ | 1.72803 | 28.4 |
|   | $R_6 = -R_5$ | $S_3 = S_2$ | | |
| IV | $R_7 = -R_4$ | $t_4 = t_1$ | 1.62032 | 60.3 |
|   | $R_8 = -R_3$ | $S_4 = S_1$ | | |
| V | $R_9 = -R_2$ | $t_5 = t_1$ | 1.62032 | 60.3 |
|   | $R_{10} = -R_1$ | | | |

In embodiment one, $N_D$ and $V$ respectively represent the refractive index and the Abbe number of the associated lens elements. These values are the same for embodiments two through siz. Also, in embodiments two through six, $R_6 = -R_5$, $R_7 = -R_4$, $R_8 = -R_3$, $R_9 = -R_2$, $R_{10} = -R_1$, $S_3 = S_2$, $t_4 = t_2$, $S_4 = S_1$ and $t_5 = t_1$.

Embodiment Two
$R_1 = 0.5080f$  $t_1 = 0.0269f$
$R_2 = 2.3560f$  $S_1 = 0.0156f$ $R_3=0.4866f$  $t_2=0.1522f$
$R_4=1.6155f$  $S_2=0.1097f$
$R_5=0.3482f$  $t_3=0.0429f$ In embodiment Two, $R_4$ is at its lower limit and $t_3$ is at its lower limit.

Embodiment Three
$R_1=0.4939f$  $t_1=0.2037f$
$R_2=2.4693f$  $s_1=0.0154f$
$R_3=0.4978f$  $t_2=0.1563f$
$R_4=1.8157f$  $S_2=0.1019f$
$R_5=0.3430f$  $t_3=0.0584f$ In embodiment three, $t_2$ is at its upper limit.

Embodiment Four
$R_1=0.4844f$  $t_1=0.2100f$
$R_2=2.4220f$  $S_1=0.0151f$
$R_3=0.4840f$  $t_2=0.1470f$
$R_4=/1.7240f$  $S_2=0.1027f$
$R_5=0.3364f$  $t_3=0.0622f$ In embodiment Four, $t_1$ is at its upper limit.

Embodiment Five
$R_1=0.4926f$  $t_1=0.2032f$
$R_2=2.6320fS_1=0.0154f$
$R_3=0.4966f$  $t_2=0.1495f$
$R_4=1.9007f$  $S2=0.1072f$
$R_5=0.3421ft_3=0.0560f$ In embodiment five, $R_2$ is at its upper limit.

Embodiment Six
$R_1=0.5081f$  $t_1=0.2096f$
$R_2=2.5403f$  $S_1=0.0079f$
$R_3=0.5089f$  $t_2=0.1542f$
$R_4=1.8247f$  $S_2=0.1110f$
$R_5=0.3528f$  $t_3=0.0459f$ In embodiment six, $S_1$ is at its lower limit and $_2$ is at its upper limit.

From Table I and the listed embodiments, it is seen that some radii may vary from those of embodiment one by up to approximately 3 percent and other radii may vary up to 11 percent, the difference in allowable variation being dictated by the magnitude of the surface aberration contributions of individual lens element surfaces. The thickness of lens elements I, II, IV and V may vary in the order of 4 or 5 percent, this narrow range being caused by the large value of the axial ray angle in the lens space. The thickness of lens III controls mainly astigmatism and may vary up to 40 percent since the astigmatic change can be removed by changing other lens element parameters. The air spaces $S_1$ and $S_4$ may be changed by 90 percent, but the air spaces $S_2$ and $S_3$ are far more sensitive due to the aforementioned axial ray angle in these spaces. $S_2$ and $S_3$ may vary only 6 percent.

The six listed embodiments have very similar correction as can be demonstrated by a comparison of their transverse spherical aberration for the mean wavelength (8521 Angstroms) at full aperture and at 0.7 aperture. The values are too similar to be apparent on a curve, so these values for the six embodiments are listed in tabular form as follows:

| Embodiment | Transverse spherical aberration in microns | |
|---|---|---|
| | Full numerical aperture | 0.7 numerical aperture |
| One | +1 | −30 |
| Two | −2 | −29 |
| Three | −1 | −30 |
| Four | +2 | −33 |
| Five | +6 | −29 |
| Six | −1 | −30 |

It is seen therefore, the six lens embodiments selected from the ranges of table I are approximately identical in performance. As previously stated, the mean wavelength is 8521 Angstroms, the wavelengths of the approximate upper and lower bounds of the desired spectral region are 10140 and 6563 Angstroms, respectively. The lens is used at unit magnification so the object and image numerical apertures are identical, their values being 0.1667 and the focal length is 26.2 millimeters. The diaphragm of the lens is the free aperture of element III, its value being 5.9 millimeters. The object and image diameters are each 10.6 millimeters.

While the invention has been particularly shown and described with reference to preferred embodiments thereof, it will be understood by those skilled in the art that various changes in form and details may be made therein without departing from the spirit and scope of the invention.

We claim:

1. A lens group comprising first, second, third, fourth and fifth lens elements, said first lens element I having curvatures defined by radii $R_1$ and $R_2$ said second lens element II having curvatures defined by Radii $R_3$ and $R_4$, said their lens element III having curvatures defined by radii $R_5$ and $R_6$, said fourth lens element IV having curvatures defined by radii $R_7$ and $R_8$ and said fifth lens element having curvatures defined by radii $R_9$ and $R_{10}$.

Said first, second, third, fourth and fifth lens elements having axial thickness $t_1$, $t_2$, $t_3$, $t_4$ and $t_5$ respectively, said first and second lens elements being separated by an axial airspace $S_1$ said second and third lens elements being separated by an axial airspace $S_2$ said third and fourth lens elements being separated by an axial airspace $S_3$ and said fourth and fifth lens elements being separated by an axial airspace $S_4$.

and wherein said radii, thicknesses and air spaces are within limits as follows where $f$ is the equivalent focal length of the lens group:

| Lens | Radii | Thicknesses and airspaces |
|---|---|---|
| I | $.470f < +R_1 < .510f$ | $.195f < t_1 < .210f$ |
| | $2.27f < -R_2 < 2.63f$ | $.008f < S_1 < .022f$ |
| II | $.474f < +R_3 < .514f$ | $.142f < t_2 < .156f$ |
| | $1.62f < +R_4 < 1.98f$ | $.102f < S_2 < .112f$ |
| III | $.330f < -R_5 < .352f$ | $.043f < t_3 < .072f$ |
| | $.330f < +R_6 < .352f$ | $.102f < S_3 < .112f$ |
| IV | $1.62f < -R_7 < 1.98f$ | $.142f < t_4 < .156f$ |
| | $.474f < -R_8 < .514f$ | $.008f < S_4 < .022f$ |
| V | $2.27f < +R_9 < 2.63f$ | $.195f < t_5 < .210f$ |
| | $.470f < -R_{10} < .510f$ | |

2. A lens group according to claim 1 wherein said radii, thickness and air-spaces are specifically as follows:

| Lens | Radius | Thickness (t) or airspace (S) | $N_D$ | V |
|---|---|---|---|---|
| I | $R_1=+.4904f$ | $t_1=.2023f$ | 1.62032 | 60.3 |
| | $R_2=-2.4518f$ | $S_1=.0153f$ | | |
| II | $R_3=+.4943f$ | $t_2=.1489f$ | 1.62032 | 60.3 |
| | $R_4=+1.8028f$ | $S_2=.1057f$ | | |
| III | $R_5=-.3405f$ | $t_3=.0611f$ | 1.72803 | 28.4 |
| | $R_6=-R_5$ | $S_3=S_2$ | | |
| IV | $R_7=-R_4$ | $t_4=t_2$ | 1.62032 | 60.3 |
| | $R_8=-R_3$ | $S_4=S_1$ | | |
| V | $R_9=-R_2$ | $t_5=t_1$ | 1.62032 | 60.3 |
| | $R_{10}=-R_1$ | | | |

Where $N_D$ and $V$ are the refractive index and the Abbe number respectively.